(No Model.)
C. C. THOMPSON.
ATTACHMENT FOR FRAGILE COOKING VESSELS.
No. 418,090. Patented Dec. 24, 1889.
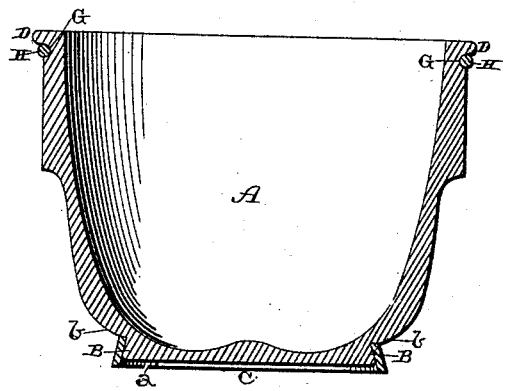
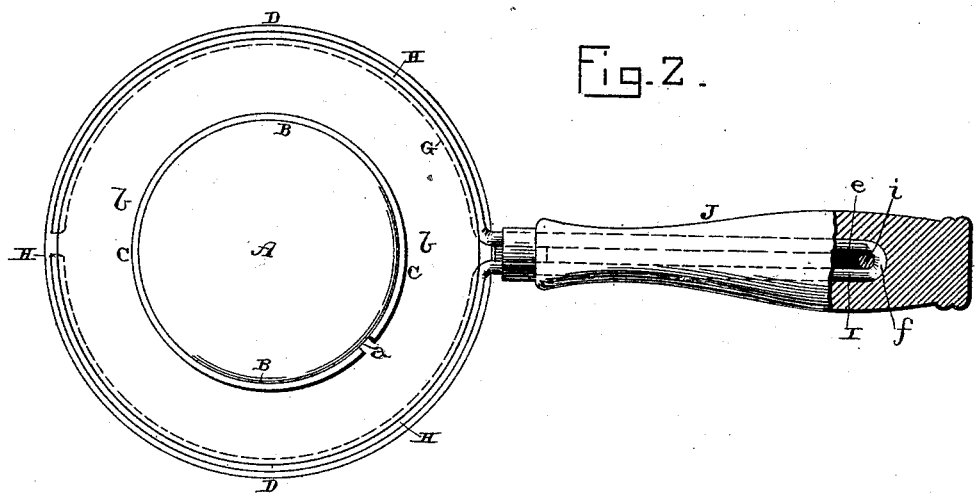
Witnesses:
E. P. Ellis,
L. L. Burket.
Inventor:
Cassius C. Thompson
per
F. A. Lehmann,
Atty.

UNITED STATES PATENT OFFICE.

CASSIUS C. THOMPSON, OF EAST LIVERPOOL, OHIO.

ATTACHMENT FOR FRAGILE COOKING-VESSELS.

SPECIFICATION forming part of Letters Patent No. 418,090, dated December 24, 1889.

Application filed January 2, 1889. Serial No. 295,209. (No model.)

*To all whom it may concern:*

Be it known that I, CASSIUS C. THOMPSON, of East Liverpool, in the county of Columbiana and State of Ohio, have invented certain new and useful Improvements in Attachments for Fragile Cooking-Vessels; and I do hereby declare the following to be a full, clear, and exact description of the invention, such as will enable others skilled in the art to which it pertains to make and use it, reference being had to the accompanying drawings, which form part of this specification.

My invention relates to an improvement in attachments for fragile cooking-vessels; and one object of my invention is to provide the vessel with a metal band around its lower edge, which projects below the bottom of the vessel, so as to protect it from immediate contact with the heated stove and to receive the jar when it is placed suddenly upon a hard substance or object, and to form the metal band with a slit, thus allowing it to be used upon vessels of varying sizes and to allow it to expand and contract with the vessel when it is hot and cold.

Another object of my invention is to provide an earthenware, glass, or other fragile cooking-vessel with a wooden handle having curved spring-actuated arms, which grasp the upper portion of the vessel; and a further and combined object of my invention is to so construct the protector and handle that they can be readily and conveniently attached to and removed from the vessel without injury to the vessel and adapted to fit vessels of varying sizes and shapes, which is a necessary construction, as will hereinafter appear.

With these objects in view my invention consists in the particular construction and arrangement of devices hereinafter more fully described, and particularly pointed out in the claims.

Figure 1 is a vertical section of a cooking-vessel with my invention attached thereto. Fig. 2 is an inverted view of the same, the handle being shown partly in section.

It is found impossible in the manufacture of pottery and fragile vessels to make them all of the same size and exactly the same shape, even though all of them are molded from the same mold or from different molds of the same size and shape. This is so because when the articles are put into a kiln for burning they do not remain uniform in size, on account of the impossibility to have all the ports of a kiln of equal temperature, and those vessels which are subjected to a hard fire shrink more and become smaller than those that are subjected to a soft or light fire. Consequently the rims and bases of different vessels vary in shape and size, even though they are made from the same mold. It is also found that pottery and fragile cooking-vessels when placed upon the stove expand, and when removed and allowed to cool contract to a very considerable extent, thus changing the size of the vessel. Carrying in mind this result in the manufacture of the article and the expanding and contracting of it when hot and cold, the particular construction of my attachments whereby they are adapted to be attached to and detached from vessels under all of these circumstances will be fully appreciated.

The cooking-vessel A is composed of pottery, glass, or other fragile substance, and is provided at its bottom with the flange B and the bulge or larger portion $b$. Around this flange B is placed a metallic spring-band protector C, which is provided with a slit $a$, that allows the band to be expanded and attached to or detached therefrom or to fit vessels which vary in shape and size. This flange B is preferably flared outward, and the metallic spring-band protector C has its upper edge of a smaller diameter than its lower edge, as shown, whereby the band is more securely held in place upon the flange and prevented from working loose and dropping off, as it would do were it made straight and the band lost its elasticity from long use and constant heating. The upper edge of the band-protector C rests against the bulge or enlarged portion $b$ of the vessel and has its lower edge to project a suitable distance below the flange, so as to prevent the vessel from coming in contact with the object upon which it is placed.

Formed around the upper end of the vessel is the external flange D, which forms a rest for the spring-arms of the handle.

J indicates the hand-hold of the handle, which is preferably made of wood, and which is provided with a longitudinal groove or opening $e$, into which the straight portion I of the wire passes, as shown. The wire is doubled upon itself at $f$, as shown, and at this point a pin $i$ is passed through the wooden portion J, by means of which the wire is securely held therein. The ends of this wire are formed into semicircular spring-arms H, which have their ends separated, as shown, and which spring-arms grasp the vessel below the flange D. Also, preferably, though not necessarily, made in the vessel just below the flange D is an annular groove G, into which the arms H catch. By means of this construction a handle is produced which can be readily detached from and attached to the vessel and is adapted to fit vessels of varying sizes and to expand and contract with the vessel when hot and cold.

Heretofore pottery and fragile cooking-vessels have not been provided with protectors and handles, because it is impracticable to make a protector and handle for each vessel, on account of their variation in shape and size. By making them of the construction here shown, however, protectors and handles which are formed upon the same die will adapt themselves to the variations which exist in the articles, as hereinbefore set forth.

Having thus described my invention, I claim—

1. The combination, with a cooking-vessel made of pottery or other fragile material provided with a flange at its bottom, of a flat metallic spring-band provided with a transverse slit placed around the flange and projecting below it, whereby it can be attached to and detached therefrom and expand and contract with the vessel, substantially as shown.

2. The combination, with a pottery or fragile vessel provided with a flange at its bottom and a bulge above the flange, of a flat metallic spring-protector of greater width than the flange and having a transverse slit, the upper edge of the spring resting against the bulge and its lower edge extending below the flange, substantially as described.

3. The combination, with a pottery or fragile cooking-vessel having an outwardly-inclined flange at its bottom, of a flat metallic spring having its upper edge of smaller diameter than its lower edge and provided with a transverse slit, whereby the spring is securely held in place, substantially as specified.

4. The combination, with a pottery or fragile cooking-vessel provided with a flange at its upper end, of a handle consisting of the hand-hold having a longitudinal opening, the wire having a straight portion extending therein and doubled at its inner end, a pin passing through the hand-hold within the said double, and two semicircular spring-arms, which grasp the vessel below the flange, whereby it can be attached to and detached therefrom and fit vessels of varying size and shape and expand and contract therewith, substantially as shown and described.

In testimony whereof I affix my signature in presence of two witnesses.

CASSIUS C. THOMPSON.

Witnesses:
 JAS. M. SMITH,
 R. E. HAUGHTON.